(No Model.)
A. G. CLINE.
Turbine Water Wheel.
No. 239,649. Patented April 5, 1881.
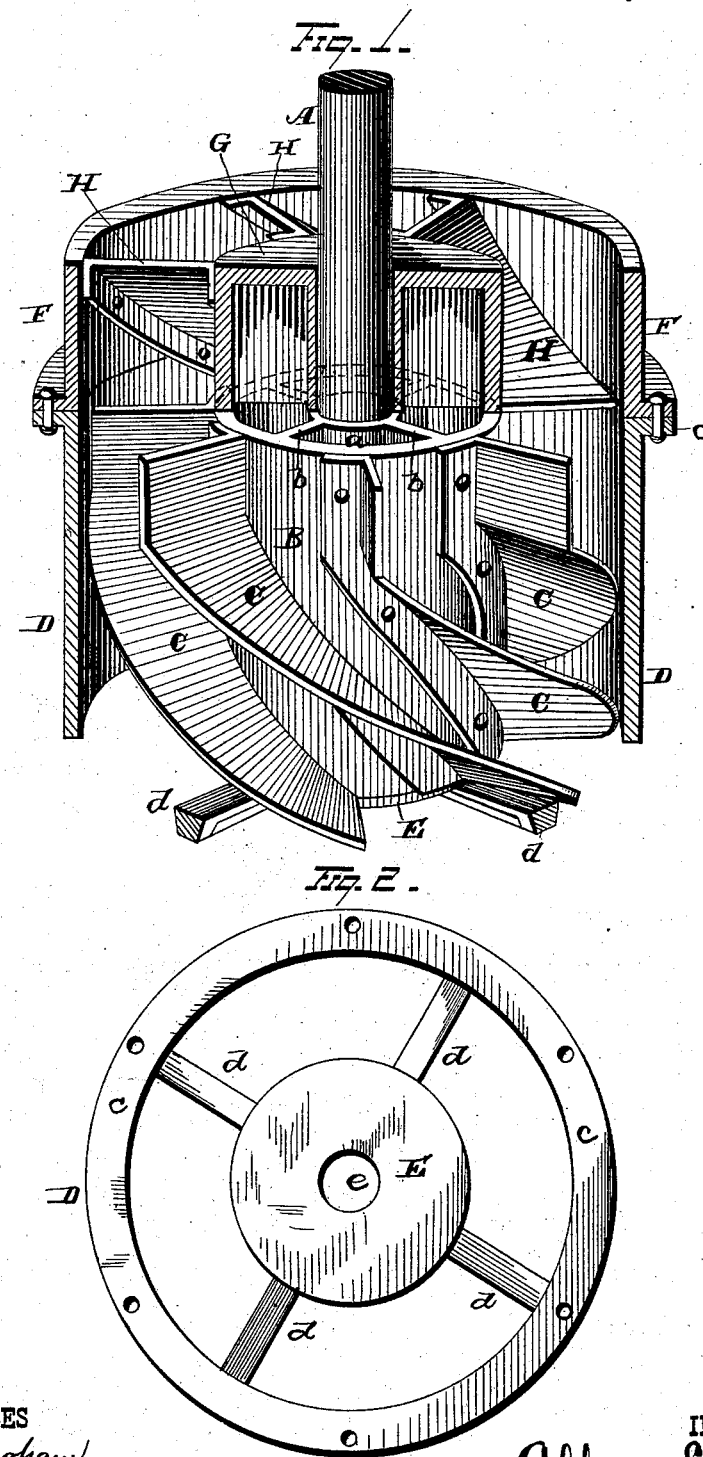
WITNESSES
INVENTOR
Alfred G. Cline.
By H. A. Seymour.
ATTORNEY

UNITED STATES PATENT OFFICE.

ALFRED G. CLINE, OF CRETE, NEBRASKA.

TURBINE WATER-WHEEL.

SPECIFICATION forming part of Letters Patent No. 239,649, dated April 5, 1881.

Application filed September 24, 1880. (No model.)

*To all whom it may concern:*

Be it known that I, ALFRED G. CLINE, of Crete, in the county of Saline and State of Nebraska, have invented certain new and useful Improvements in Turbine Water-Wheels; and I do hereby declare the following to be a full, clear, and exact description of the invention, such as will enable others skilled in the art to which it pertains to make and use it, reference being had to the accompanying drawings, which form part of this specification.

My invention relates more particularly to that class of water-wheels termed "parallel-flow turbines," by reason of the flow of water being parallel to the rotary axis of the wheel.

The improvement consists in the combination, with a drum having exterior buckets and a cylinder inclosing the latter, of a disk fitted closely against the lower end of the drum and flush with its outer side, and peripheral arms securing the disk to the inclosing-cylinder, said disk being provided with a central hole for the shaft.

In the drawings, which represent parts sufficient to illustrate the invention, Figure 1 is a view, in perspective, of the wheel, a portion of the side being broken away for better view. Fig. 2 is a plan view, in detail, of the cylinder which incases the bucket-wheel.

The rotary shaft A has secured to its lower portion the hub $a$, provided with radial arms $b$, which latter connect with drum B. The exterior of this drum is provided with blades C, which have their main portion formed spiral, while their upper portions are formed vertical.

A cylinder, D, is formed of same height as the drum of the bucket-wheel, and closely incloses the buckets. The upper rim of the cylinder is formed with an outward horizontal flange, $c$, adapted to constitute a bearing for the wheel. The bottom of the cylinder is fitted with a central disk, E, of same diameter with the drum of the bucket-wheel. Peripheral arms $d$ secure said disk to the interior lower portion of the cylinder. The central portion of this disk is provided with an opening, $e$, for the step of the shaft upon which the wheel revolves.

A cap provided with an annular side, F, is secured to the top of the cylinder, the central portion of the cap being provided with a disk, G, of same diameter with the drum of the bucket-wheel.

Chutes H are formed between the annular side of the cap and the central disk. These chutes respectively incline in an opposite direction to the buckets, and are located in the same vertical annular plane therewith. Any suitable form of gates may be employed to open or close communication of said chutes with the water.

The operation of the wheel is readily apparent. Water being admitted by the gates, it passes down the several chutes and is discharged upon the buckets. The latter, being thus acted upon by the water, cause the inner wheel to revolve, and the water passes out through the openings formed between the peripheral arms at the bottom of the cylinder. The shaft to which the inner wheel is secured is revolved and adapted to actuate any machinery which may be geared thereto.

Having fully described my invention, what I claim as new, and desire to secure as Letters Patent, is—

In a turbine water-wheel, the combination, with a drum having exterior buckets and a cylinder inclosing the latter, of a disk fitted closely against the lower end of the drum and flush with its outer side, and peripheral arms securing the disk to the inclosing-cylinder, said disk being provided with a central hole for the shaft, substantially as set forth.

In testimony that I claim the foregoing I have hereunto set my hand this 15th day of September, 1880.

ALFRED G. CLINE.

Witnesses:
  H. C. RIDER,
  E. V. KING.